US008554767B2

(12) United States Patent
Song et al.

(10) Patent No.: US 8,554,767 B2
(45) Date of Patent: Oct. 8, 2013

(54) CONTEXT-BASED INTERESTS IN COMPUTING ENVIRONMENTS AND SYSTEMS

(75) Inventors: Yu Song, Pleasanton, CA (US); Sangoh Jeong, Palo Alto, CA (US); Doreen Cheng, San Jose, CA (US); Swaroop S. Kalasapur, Santa Clara, CA (US)

(73) Assignee: Samsung Electronics Co., Ltd, Suwon (KR)

( * ) Notice: Subject to any disclaimer, the term of this patent is extended or adjusted under 35 U.S.C. 154(b) by 916 days.

(21) Appl. No.: 12/343,395

(22) Filed: Dec. 23, 2008

(65) Prior Publication Data

US 2010/0161544 A1 Jun. 24, 2010

(51) Int. Cl.
*G06F 7/00* (2006.01)
(52) U.S. Cl.
USPC ......................................................... 707/732
(58) Field of Classification Search
USPC ........ 706/52, 45, 12; 707/732–734, 705, 722, 707/735; 705/10, 7.33; 455/414.1, 414.2
See application file for complete search history.

(56) References Cited

U.S. PATENT DOCUMENTS

| | | | |
|---|---|---|---|
| 5,778,363 A | 7/1998 | Light | |
| 6,317,718 B1 | 11/2001 | Fano | |
| 6,341,305 B2 | 1/2002 | Wolfe | |
| 6,571,279 B1 | 5/2003 | Herz et al. | |
| 6,801,909 B2 | 10/2004 | Delgado et al. | |
| 6,839,680 B1 * | 1/2005 | Liu et al. | 705/7.33 |
| 6,912,386 B1 | 6/2005 | Himberg et al. | |
| 7,137,099 B2 | 11/2006 | Knight et al. | |
| 7,221,947 B2 | 5/2007 | Casey | |
| 7,336,964 B2 | 2/2008 | Casey | |
| 7,571,124 B2 | 8/2009 | Bodin | |
| 7,818,674 B2 | 10/2010 | Koch | |
| 7,970,637 B2 | 6/2011 | Macbeth et al. | |
| 7,979,445 B2 | 7/2011 | Mason | |
| 8,005,831 B2 | 8/2011 | Hull et al. | |
| 2002/0174199 A1 | 11/2002 | Horvitz | |
| 2003/0149604 A1 | 8/2003 | Casati et al. | |
| 2004/0049537 A1 | 3/2004 | Titmuss | |

(Continued)

OTHER PUBLICATIONS

Oku et al., "Context-aware SVM for context-dependent information," Proceedings of the $7^{th}$ International Conference on Mobile Data Management (MDM '06), 2006.

(Continued)

*Primary Examiner* — Hung T Vy
(74) *Attorney, Agent, or Firm* — Kenneth L. Sherman, Esq.; Michael Zarrabian, Esq.; Sherman & Zarrabian LLP

(57) ABSTRACT

Techniques for determining an interest in an object of interest in a given situation are disclosed. Multiple situation-based interest rating components can be provided for various situations. Each situation-based interest rating component can include an interest value indicative of interest in an object of interest in one of the situations. An input situation can then be obtained. One of the situation-based interest rating components can be identified matching an input situation. The relevance of one or more of the other situation-based interest rating components to the identified matching component can then be determined. This can, for example, be done by computing one or more distances between only the respective situation-based portions of the matching situation-based interest rating component and one or more of the other components, or based on the interest value-based portion of each component, or both.

24 Claims, 7 Drawing Sheets

(56) References Cited

U.S. PATENT DOCUMENTS

| | | | |
|---|---|---|---|
| 2004/0093157 | A1 | 5/2004 | Muller et al. |
| 2004/0098469 | A1 | 5/2004 | Kindo et al. |
| 2004/0127253 | A1 | 7/2004 | Hauptvogel et al. |
| 2004/0230994 | A1 | 11/2004 | Urdang et al. |
| 2005/0034078 | A1 | 2/2005 | Abbott et al. |
| 2005/0201392 | A1 | 9/2005 | Tam et al. |
| 2005/0219069 | A1* | 10/2005 | Sato et al. ............... 341/50 |
| 2006/0020662 | A1 | 1/2006 | Robinson |
| 2007/0078849 | A1 | 4/2007 | Slothouber |
| 2007/0112630 | A1 | 5/2007 | Lau et al. |
| 2007/0118498 | A1 | 5/2007 | Song et al. |
| 2007/0136264 | A1 | 6/2007 | Tran |
| 2007/0207782 | A1* | 9/2007 | Tran ............... 455/414.1 |
| 2007/0290841 | A1 | 12/2007 | Gross |
| 2008/0097822 | A1* | 4/2008 | Schigel et al. ............... 705/10 |
| 2008/0147546 | A1 | 6/2008 | Weichselbaumer et al. |
| 2008/0172274 | A1 | 7/2008 | Hurowitz et al. |
| 2008/0214156 | A1 | 9/2008 | Ramer et al. |
| 2008/0248801 | A1* | 10/2008 | Fletcher et al. ............ 455/435.2 |
| 2008/0281687 | A1 | 11/2008 | Hurowitz et al. |
| 2008/0294621 | A1 | 11/2008 | Kanigsberg et al. |
| 2008/0294622 | A1 | 11/2008 | Kanigsberg et al. |
| 2008/0294624 | A1 | 11/2008 | Kanigsberg et al. |
| 2009/0037355 | A1* | 2/2009 | Brave et al. ............... 706/45 |
| 2009/0117881 | A1 | 5/2009 | Deshpande |
| 2009/0125462 | A1 | 5/2009 | Krishnaswamy et al. |
| 2009/0125517 | A1 | 5/2009 | Krishnaswamy et al. |
| 2009/0271271 | A1 | 10/2009 | Johnson |
| 2009/0276377 | A1* | 11/2009 | Dutta et al. ............... 706/12 |
| 2010/0004997 | A1 | 1/2010 | Mehta et al. |
| 2010/0076777 | A1 | 3/2010 | Paretti et al. |
| 2010/0106603 | A1 | 4/2010 | Dey et al. |
| 2010/0161380 | A1 | 6/2010 | Song et al. |
| 2010/0161381 | A1 | 6/2010 | Song et al. |
| 2010/0198604 | A1 | 8/2010 | Song et al. |
| 2011/0039524 | A1 | 2/2011 | Gross |
| 2011/0153452 | A1 | 6/2011 | Flinn et al. |
| 2011/0246070 | A1 | 10/2011 | Fitzpatrick et al. |

OTHER PUBLICATIONS

Rack et al., "Context-aware, ontology-based recommendation." Proceedings of the International Symposium on Applications and the Internet Workshops (SAINTW '06), 2005.

Woerndl et al., "Utilizing physical and social context to improve recommender systems." IEEE International Conferences on Web Intelligence and Intelligent Agent Technology Workshops, 2007.

Woerndl et al., "A hybrid recommender system for context-aware recommendations of mobile applications." IEEE 2007.

Ricci et al., "Acquiring and revising preferences in a critique-based mobile recommender system." IEEE Computer Society, 2007.

Zhang et al., "Spontaneous and context-aware media recommendation in heterogeneous spaces." IEEE 2007.

Cho et al., "Minimum Sum-Squared Residue Co-clustering of Gene Expression Data", Proceedings of the Fourth SIAM International Conference on Data Mining (SDM), pp. 114-125, Apr. 2004.

Madeira et al., "Biclustering algorithms for biological data analysis: a survey." IEEE Transactions on Computational Biology and Bioinformatics, vol. 1, issue 1, pp. 24-45, 2004.

Chen et al., "A Survey of Context-Aware Mobile Computing Research," Dartmouth Computer Science Technical Report TR2000-381, Dartmouth College, 2000.

Herlocker et al., "An Algorithmic Framework for Performing Collaborative Filtering." In Proc. of SIGIR, 1999.

Deshpande et al., "Item-based top-n recommendation algorithms." In Proc. of IEEE MDM '06, 2006.

J.A. Flanagan. "Unsupervised clustering of context data and learning user requirements for a mobile device." $5^{th}$ International and Interdisciplinary Conference on Modeling and Using context (CONTEXT-05), pp. 155-168, 2005.

J.B. MacQueen. "Some Methods for classification and analysis of multivariate observations." Proceedings of $5^{th}$ Berkeley Symposium on Methematical Statistics and Probability, Berkeley, University of California Press, 1:281-297, 1967.

Gersho et al., "Vector Quantization and Signal Compression" chapters 2-4, Kluwer Academic Press, 1992.

Linde et al., "An algorithm for vector quantizer design." IEEE Transactions on Communications, vol. Com-28, No. 1, Jan. 1980.

Mobasher et al., "Semantically Enhanced Collaborative Filtering on the Web." AAIWorkshop on Semantic Web Personalization (SWP 2004).

Leung et al., "Applying Cross-Level Association Rule Mining to Cold-Start Recommendation!" Web Intelligence and Intelligent Agent Technology, 2007.

Szomszor et al., "Folksonomies, the Semantic Web, and Movie Recommendations," $4^{th}$ European Semantic Web Conference, 2007.

Park et al., "Naïve Filterbots for Robust Cold-Start Recommendations," KDD 2006.

Good et al., "Combining Collaborative Filtering with Personal Agents for Better Recommendations," AAAI/IAAI, 1999.

Office Action dated Nov. 5, 2010 from U.S. Appl. No. 12/343,392.

Final Office Action dated Feb. 28, 2011 from U.S. Appl. No. 12/343,392.

Tong et al., "Support Vector Machine Active Learning with Application to Text Classification," Journal of Machine Learning Research, 2001, pp. 46-66.

Office Action dated Dec. 12, 2011 from U.S. Appl. No. 12/343,393.

Office Action dated Dec. 27, 2011 from U.S. Appl. No. 12/363,662.

Gehrt et al., "Situational, consumer, and retailer affecting Internet, catalog, and story shopping" International Journal of Retail & Distribution Management v32n1 pp. 5-18, 2004.

Notice of Allowance dated Jan. 5, 2012 from U.S. Appl. No. 12/343,395.

U.S. Final Office Action mailed Nov. 23, 2012 from U.S. Appl. No. 12/363,662.

Notice of Allowance dated Mar. 2, 2012 from U.S. Appl. No. 12/343,393.

* cited by examiner

|  | 404 | 406 | 408 |
|---|---|---|---|
|  | CONTEXT VARIABLE 1 | CONTEXT VARIABLE 2 | INTEREST OBJECT |
| 402a | SITUATION 1 | | INTEREST VALUE |
| 402b | SITUATION 2 | | INTEREST VALUE |
|  | .... | | INTEREST VALUE |
| 402N | SITUATION N | | INTEREST VALUE |

Figure 4A

|  | 414 | 416 | 418 |
|---|---|---|---|
|  | PLACE | TIME | INTEREST IN GAME |
| 410a | 0 1 (work) | 0 0 1 (night) | 2.33 |
| 410b | 0 1 (work) | 0 1 0 (midday) | - |
| 410c | 0 1 (work) | 1 0 0 (morning) | - |
| 410d | 1 0 (home) | 0 0 1 (night) | 4 |
| 410e | 1 0 (home) | 0 1 0 (midday) | 3 |
|  | ... | ... | ... |

CONTEXT-BASED INTERESTS IN COMPUTING ENVIRONMENTS AND SYSTEMS

BACKGROUND OF THE INVENTION

Conceptually, a computing system (e.g., a computing device, a personal computer, a laptop, a Smartphone, a mobile phone) can accept information (content or data) and manipulate it to obtain or determine a result based on a sequence of instructions (or a computer program) that effectively describes how to process the information. Typically, the information used by a computing system is stored in a computer readable memory using a digital or binary form. More complex computing systems can store content including the computer program itself. A computer program may be invariable and/or built into, for example a computer (or computing) device as logic circuitry provided on microprocessors or computer chips. Today, general purpose computers can have both kinds of programming. A computing system can also have a support system which, among other things, manages various resources (e.g., memory, peripheral devices) and services (e.g., basic functions such as opening files) and allows the resources to be shared among multiple programs. One such support system is generally known as an Operating System (OS) which provides programmers with an interface used to access these resources and services.

Today, numerous types of computing devices are available. These computing devices widely range with respect to size, cost, amount of storage and processing power, from the expensive and powerful servers, relatively cheaper Personal Computers (PC's) and laptops, to more inexpensive microprocessors or computer chips provided in storage devices, automobiles, and household electronic appliances.

A popular task for many computing devices is to link people with relevant information. Different computing devices perform such linking in a variety of ways, depending on the needs of a particular application. Many people, for example, are accustomed to typing keywords into an Internet search engine to find desirable information. Visitors to an e-commerce site are often greeted with ads and recommendations tailored to their preferences. Particular computing devices derive such recommendations from a comparison between the visitor's past purchasing decisions and the purchasing decisions of other users.

The generation of recommendations in this manner can involve the processing of large amounts of user data. Various techniques have been used to optimize such processing. Some computing devices use fixed, predetermined rules that prioritize one type of user data over another in making a recommendation. Other computing devices, for example, pose direct questions to a user to determine what the user desires at a later time.

These approaches, while effective in many applications, have weaknesses. Direct questioning is often disliked by users and consumes time and system resources. Rules typically require updating and may be based on faulty assumptions.

Another weakness of current approaches is that they do not seem to generate recommendations based on multiple contexts such as time and location.

Accordingly, techniques that can help computing devices make better recommendations for one or more users would be useful.

SUMMARY OF THE INVENTION

Broadly speaking, the invention relates to computing systems. More particularly, the invention pertains to techniques for predicting a level of interest in given situation. The situation can, for example, be presented by multiple contexts, conditions and/or circumstances.

Techniques for determining an interest in an object of interest in a given situation are disclosed. Multiple situation-based interest rating components can be provided for various situations. Each situation-based interest rating component can include an interest value indicative of interest in an object of interest in one of the situations. An input situation can then be obtained. One of the situation-based interest rating components can be identified as matching an input situation. The relevance of one or more of the other situation-based interest rating components to the identified matching component can then be determined. This can, for example, be done by computing one or more distances between only the respective situation-based portions of the matching situation-based interest rating component and one or more of the other components, or based on the interest value-based portion of each component, or both.

One embodiment of the invention pertains to a method of determining interest in an object of interest in a given situation. The method includes obtaining multiple situation-based interest rating components for various situations. Each situation-based interest rating component includes an interest value. The interest value indicates interest in an object of interest in one of the situations. These components may be structured in a variety of ways. For example, a particular component may indicate that a user has an average interest level of 2.34 (i.e. a moderately low level of interest) in games when he is at home in the morning. Each of the situations (e.g. "home" and "morning") may be effectively represented by a plurality of context variables (e.g. "time" and "location"). Each of the context variables in turn is associated with multiple possible context values (e.g. the context variable "time" may have possible context values, "morning," "noon" and "night," etc.) In some embodiments, each situation-based interest rating component pertains to a different situation and thus different context values.

The method also includes obtaining an input situation that is effectively represented by a plurality of input context values. The input situation may refer to a variety of conditions and/or circumstances. A particular input situation, for example, may refer to the current time or location of a user.

Afterwards, one of the situation-based interest rating components is identified as a matching situation-based interest rating component. This identification operation is based on the input situation. The operation may be performed in various ways. For example, in a particular embodiment, if the input situation is "home" and "morning," then the situation-based interest rating component that is also associated with "home" and "morning" would be identified as the matching component.

The relevance of one or more of the other situation-based interest rating components to the matching situation-based interest rating component is then determined. In some embodiments, this operation involves computing a distance between portions of the matching situation-based component and other components. In other embodiments, the distance calculation makes use of components in their entirety. A projected interest value for the input situation is then determined. This determination is based on the one or more relevancies calculated in the previous operation.

Various embodiments of the invention use a wide variety of situation-based interest rating components, context variables, context values, interest objects and/or interest levels. For example, the context variables and values may pertain to environmental variables (e.g., proximity to other devices or human beings, temperature, GPS signals, motion, acceleration etc.), internal variables (e.g., active applications on a computer, time, mode of operation etc.) and/or other factors. The incorporation of multiple context variables helps improve the accuracy and relevance of the resulting prediction.

Various embodiments may entail different types of encoding and predicting operations, depending on the needs of a particular application. For example, in some embodiments situation-based interest rating components and context values are encoded as binary, multi-dimensional vectors. In certain iterations of the invention, the prediction of a projected interest value may use a weighted sum. The weighted sum may take many forms. For example, the weighted sum calculation may be based at least partly on the calculating of a distance between a vector associated with the matching situation-based interest rating component and a vector representing a different situation-based interest rating component. The calculating of a distance may use a cosine distance formula, a Euclidean distance formula or some other type of formula and/or algorithm.

The invention can be implemented in numerous ways, including, for example, a method, an apparatus, a computer readable medium, and a computing system (e.g., one or more computing devices). Several embodiments of the invention are discussed below.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 4A depicts multiple situation-based interest rating components in accordance with various embodiments of the invention.

FIG. 4B depicts multiple exemplary situation-based interest rating components in accordance with various embodiments of the invention.

DETAILED DESCRIPTION OF THE INVENTION

Figure 1:
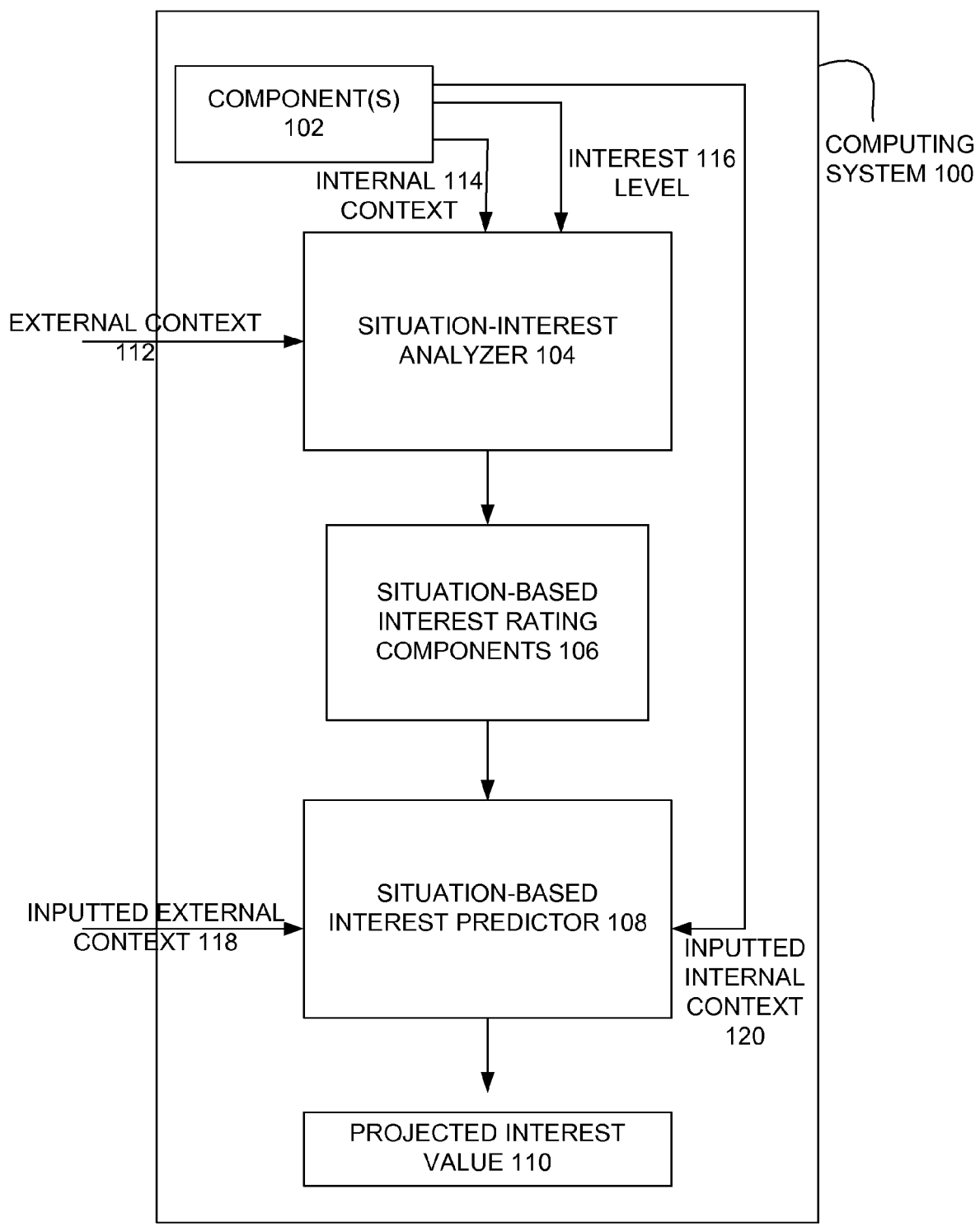
FIG. 1 depicts a computing system in accordance with various embodiments of the invention.

Techniques for determining an interest in an object of interest in a given situation are disclosed. Multiple situation-based interest rating components can be provided for various situations. Each situation-based interest rating component can include an interest value indicative of interest in an object of interest in one of the situations. An input situation can then be obtained. One of the situation-based interest rating components can be identified matching an input situation. The relevance of one or more of the other situation-based interest rating components to the identified matching component can then be determined. This can, for example, be done by computing one or more distances between only the respective situation-based portions of the matching situation-based interest rating component and one or more of the other components, or based on the interest value-based portion of each component, or both.

One embodiment of the invention pertains to a method of determining interest in an object of interest in a given situation. The method includes obtaining multiple situation-based interest rating components for various situations. Each situation-based interest rating component includes an interest value. The interest value indicates interest in an object of interest in one of the situations. These components may be structured in a variety of ways. For example, a particular component may indicate that a user has an average interest level of 2.34 (i.e. a moderately low level of interest) in games when he is at home in the morning. Each of the situations (e.g. "home" and "morning") may be effectively represented by a plurality of context variables (e.g. "time" and "location"). Each of the context variables in turn is associated with multiple possible context values (e.g. the context variable "time" may have possible context values, "morning," "noon" and "night," etc.). In some embodiments, each situation-based interest rating component pertains to a different situation and thus different context values.

The method also includes obtaining an input situation that is effectively represented by a plurality of input context values. The input situation may refer to a variety of conditions and/or circumstances. A particular input situation, for example, may refer to the current time or location of a user.

Afterwards, one of the situation-based interest rating components is identified as a matching situation-based interest rating component. This identification operation is based on the input situation. The operation may be performed in various ways. For example, in a particular embodiment, if the input situation is "home" and "morning," then the situation-based interest rating component that is also associated with "home" and "morning" would be identified as the matching component.

The relevance of one or more of the other situation-based interest rating components to the matching situation-based interest rating component is then determined. In some embodiments, this operation involves computing a distance between portions of the matching situation-based component and other components. In other embodiments, the distance calculation makes use of components in their entirety. A projected interest value for the input situation is then determined. This determination is based on the one or more relevancies calculated in the previous operation.

Various embodiments of the invention use a wide variety of situation-based interest rating components, context variables, context values, interest objects and/or interest levels. For example, the context variables and values may pertain to environmental variables (e.g., proximity to other devices or human beings, temperature, GPS signals, motion, acceleration etc.), internal variables (e.g., active applications on a computer, time, mode of operation etc.) and/or other factors. The incorporation of multiple context variables helps improve the accuracy and relevance of the resulting prediction.

Various embodiments may entail different types of encoding and predicting operations, depending on the needs of a particular application. For example, in some embodiments situation-based interest rating components and context values are encoded as binary, multi-dimensional vectors. In certain iterations of the invention, the prediction of a projected interest value may use a weighted sum. The weighted sum may take many forms. For example, the weighted sum calculation may be based at least partly on the calculating of a distance between a vector associated with the matching situation-based interest rating component and a vector representing a different situation-based interest rating component. The calculating of a distance may use a cosine distance formula, a Euclidean distance formula or some other type of formula and/or algorithm.

As noted above, various techniques exist for making recommendations on behalf of a user. These techniques are effective in certain circumstances but have weaknesses as well. Some of these techniques, for example, require direct feedback from users about their interests or utilize fixed, predetermined rules that prioritize one type of user data over another.

It will be appreciated that the invention does not require such features. As a method for predicting interest in an object of interest given a specific situation, one embodiment of the invention involves obtaining a situation-based interest rating component. A situation-based interest rating component can take many forms. For example, one type of component is derived from data captured from a user's prior behavior and characterizes a user's interests (e.g., in terms of type of interest, intensity of the interest, etc.) in a specific situation. For instance, one situation-based interest rating component may indicate that a user on average has an interest value of 2.34 (indicating a moderately low level of interest) in music when he is at home in the evening. Such situation-based rating components could be determined for many different situations (e.g. "interest value 3.75 for being at home in the evening," "interest value 1.72 for being at work in the morning," etc.).

In this embodiment, after situation-based interest rating components have been obtained for multiple, different situations, a specific input situation is obtained (e.g. "at home in the evening.") Then, a matching situation-based interest rating component is found for the specific input situation. In some embodiments, the matching operation is based at least in part on finding a matching situation, although other aspects of the components may also be taken into account. Using a simple example, if the input situation is "at home in the evening," the matching situation-based interest rating component may be the component also associated with "at home in the evening."

The relevance of this matching situation-based interest rating component to other situation-based interest rating components is then determined. This relevance determination, for instance, could involve encoding at least portions of the situation-based interest rating components (including the matching one) and computing distances between the matching situation-based interest rating component and the other components. Based on this evaluation, an interest value in an object of interest is predicted.

One embodiment of the invention is depicted in FIG. 1. FIG. 1 illustrates computing system 100, which includes one or more components 102, situation-interest analyzer 104 and situation-based interest level predictor 108. In the illustrated embodiment, components 102 run applications, observe processes in the system and/or store logs of past activity etc. Computing system 100 has one or more processors (not shown) and may be configured in a variety of ways, depending on the needs of a particular application. For example, computing system 100 may be a mobile device, a server and one or more clients and/or multiple computer devices.

Situation-interest analyzer 104 is configured to determine situation-based interest rating components. In the illustrated embodiment, these components are based on data accumulated from various internal and external sources. Situation-interest analyzer 104 receives data relating to internal contexts 114 from components 102 and external contexts 112 from the outside environment. It also may also correlate such data with additional information characterizing interests on the part of one or more users (i.e. types of interests, the intensities of those interests, user actions implying specific interests etc.). The types of contexts examined by the situation-interest analyzer 104 can vary widely, depending on the needs of a particular application. Examples of internal contexts include the number and type of applications that are currently running, modes of operation, logs of past user behavior and/or timing information. Examples of external contexts may include data relating to location, speed, motion, proximity to a device, GPS signals and/or temperature. Situation-interest analyzer 104 may take into account other factors and contexts as well.

Based on the above data, situation-interest analyzer 104 produces situation-based interest rating components 106. In the illustrated embodiment, the situation-based interest rating components 106 capture situation-based interest patterns in the accumulated data. For instance, one of the situation-based interest rating compounds 106 may indicate that the user has on average a moderately high level of interest (indicated by a numerical value of 4.35 on a range of 0 to 5) in game applications when he or she is at home in the evening.

Situation-based interest rating components 106 are then received by situation-based interest predictor 108. Situation-based interest predictor 108 also receives additional input external contexts 118 and input internal contexts 120. Situation-based interest predictor 108 uses this data to generate predicted interest value 110. In the illustrated embodiment, predicted interest value 110 is an estimation of a degree of interest in an object of interest that would occur in a situation represented by input external contexts 118 and input internal contexts 120. To use a very simple example, situation-based interest predictor 108 may receive input relating to a location-based external context (e.g., "workplace") and a time-based internal context (e.g., "the afternoon"). Based on situation-based interest rating components 106 and these inputted context values, the context-based interest level predictor 108 in this example may predict that the interest level in, say, a gaming application would be "high" as opposed to "medium" or "low." To predict such values, the situation-based interest predictor 108 may encode some or all of the situation-based interest rating components 106 as vectors and selectively calculate distances between them. Of course, the characteristics and operations of the situation-based interest predictor 108 may vary widely, depending on the needs of a particular application.

Figure 2:
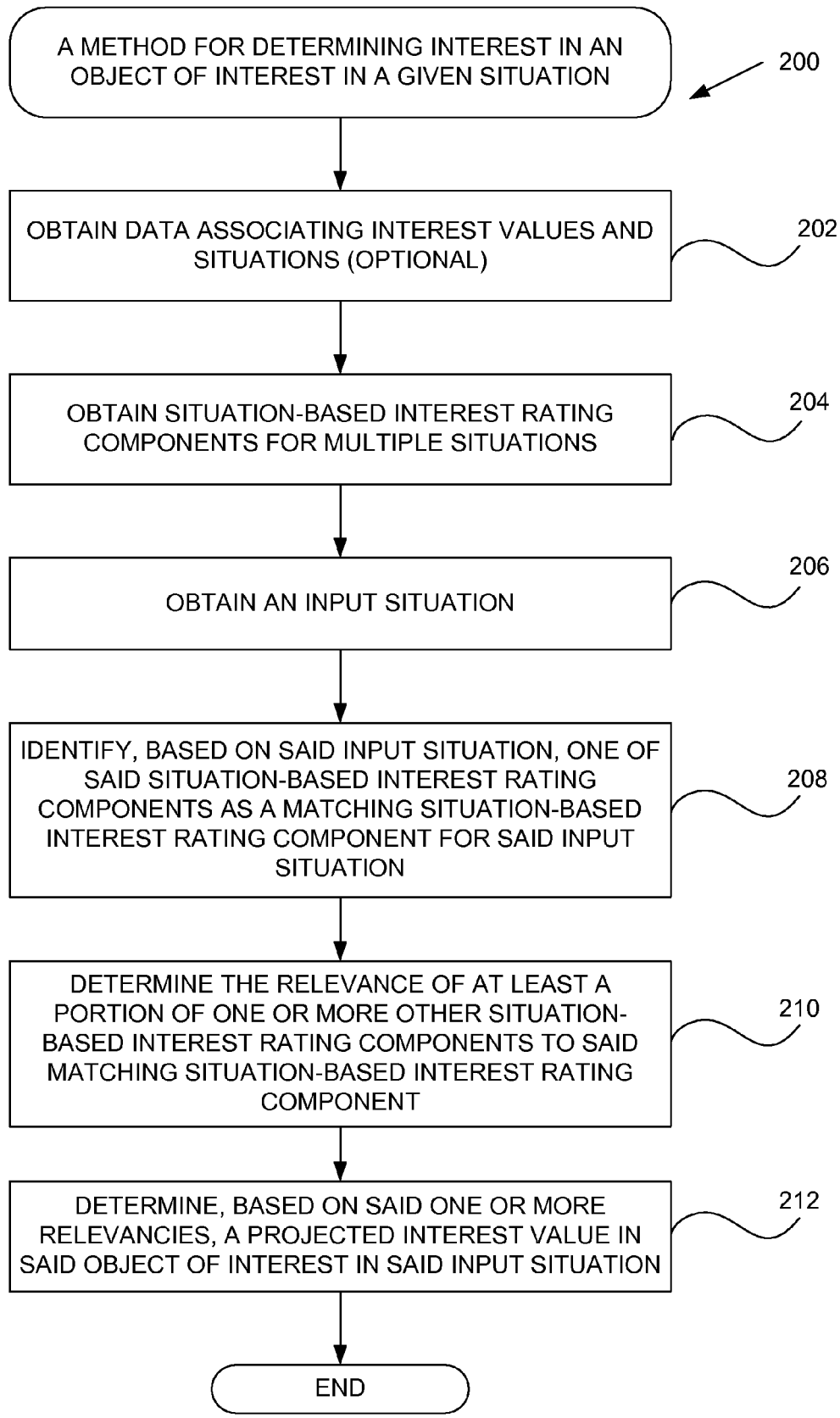
FIG. 2 depicts a method for determining interest in an object of interest in a given situation in accordance with various embodiments of the invention.

One embodiment of the invention, illustrated in FIG. 2, pertains to a method 200 that predicts an interest level in an interest object given an input situation. The operations in FIG. 2 will be elaborated upon in further detail with reference to FIGS. 3A to 5. However, those skilled in the art will readily appreciate that the detailed description given herein with respect to these figures is for explanatory purposes as the invention extends beyond these limited embodiments. The method begins with optional step 202 of FIG. 2, which involves obtaining data relating to specific interest levels occurring in situations characterized by various context values.

Such data may take a variety of different forms. For example, certain types of data involve a linking between a specific level of interest in an interest object (e.g., a high level of interest in pop music) and two or more context values (e.g., being at home, in the evening). Other types of data may be more or less specific and/or integrate other factors. The data may be drawn from the actions of one or more users, the tracking or observation of patterns of behavior, and/or be estimates. The data can be formatted and stored in a variety of ways as well. For example, the data can take the form of multiple data associations, in which context variables, which represent one or more situations, are associated with specific interest levels.

Figure 3A:
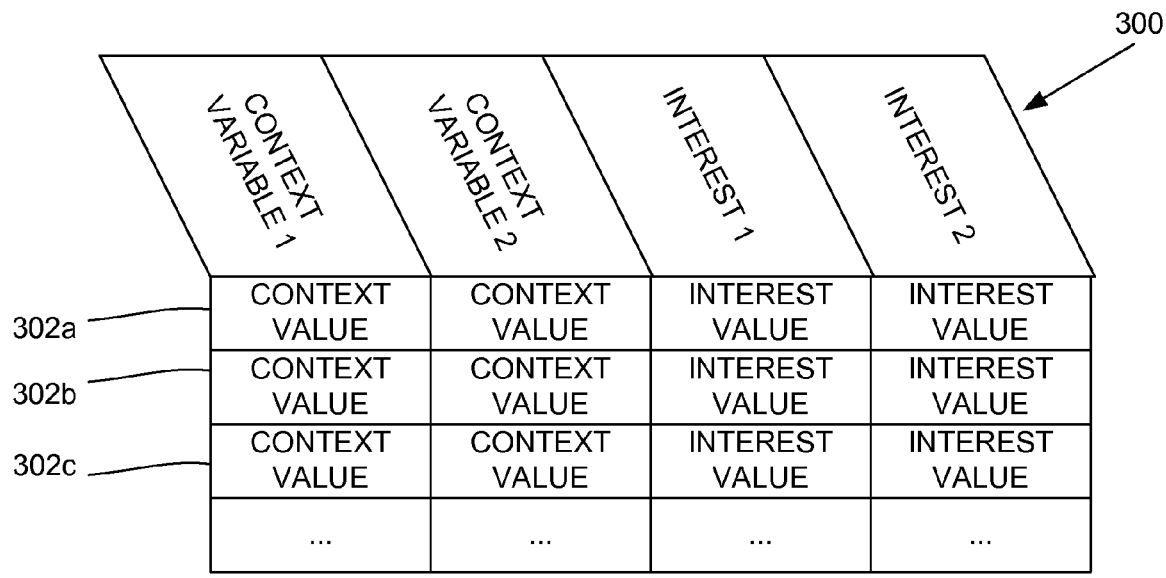
FIG. 3A illustrates a set of data associations in accordance with various embodiments of the invention.

FIG. 3A illustrates an example of one type of data association. FIG. 3A includes data association set 300, which includes data associations 302a-c, which are structured as rows in the illustrated embodiment. Each data association 302a-c has two associated context variables and two interests. (Of course, more or fewer context variables and/or interests are possible.) Each context variable can be filled with one or more possible context values, which in some embodiments are limited to a specific range of discrete context values. Alternatively, context values may be drawn from an unlimited number of values. Interest values can be similarly broad or constrained. In the illustrated embodiment, the context variables 1 and 2 help characterize a situation and the interests 1 and 2 help measure a degree of interest in two different interest objects.

Figure 3B:
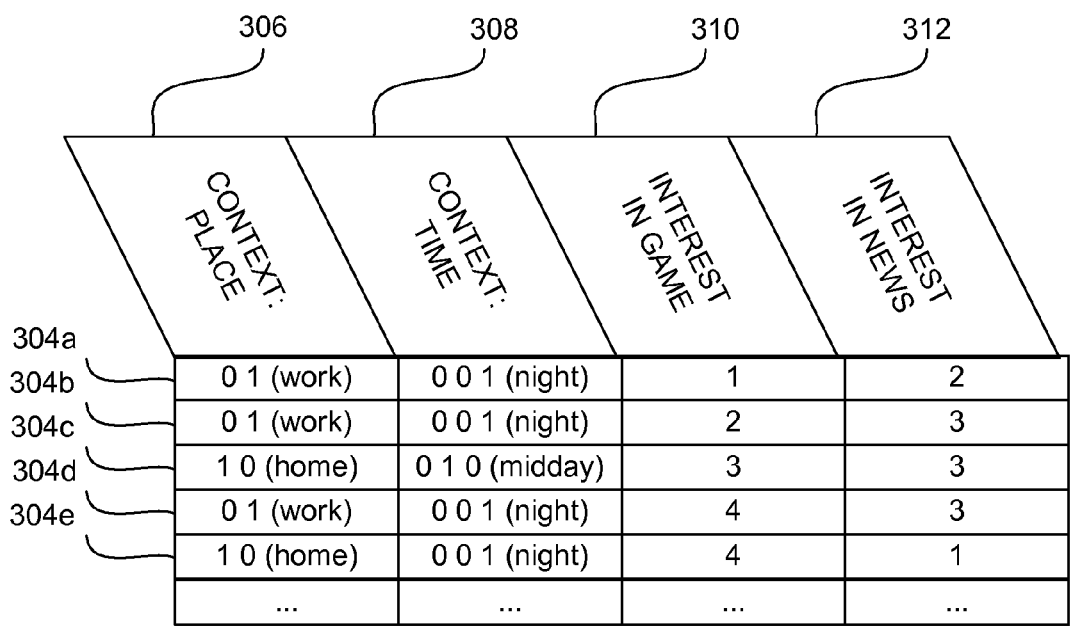
FIG. 3B illustrates an exemplary set of data associations in accordance with various embodiments of the invention.

A simple, more detailed example of a data association is provided in FIG. 3B. In the illustrated embodiment, five data associations 304a-e are presented in rows. The context variables 306 and 308 relate to place and time respectively. The interest objects include an interest 310 in a game application and an interest 312 in a news application. Each data association 304a-e has context values for the context variables and interest values for the interest objects. For example, data association 304a has context variable "place" with the context value "work", context variable "time" with the context value "night" and an interest level of 1 in a gaming application and an interest level of 2 in a news application. In this example, the interest levels are drawn from the range of integers between 0 and 4. This data association could be taken to mean, for example, that at one point in time, a user evidenced a low level of interest in a gaming application but a slightly higher level of interest in a news application at work during the night. Other interpretations and relationships between the various values and variables are also possible. Other data associations may have similar or different values.

It should be appreciated that the data associations, variables and/or values may be configured in a variety of ways, depending on the needs of a particular application. In certain embodiments, context values and interest levels may be predefined and/or limited to a discrete number of values. For example, in the highly simplified example of FIG. 3B, the context values for the context variables "place" and "time" are encoded as multi-dimensional, binary vectors (i.e. vectors that encode data in the form of multiple 0's and 1's or other equivalent values). Context variable "place" has two possible context values, "home" and "work," which are encoded as "1 0" and "0 1" respectively. Context variable time has three possible context values, "morning," "midday" and "night," which are encoded as "1 0 0", "0 1 0" and "0 0 1" respectively. This is referred to as 1-in-N encoding. In other words, for a specific context variable, N is an integer equal to the number of possible context values. Each context value for that variable is encoded as a vector with N binary values. In the illustrated embodiment, the context value vectors for a specific context variable are similar in that they have the same number of values, but each is unique in terms of where their respective 1 values are positioned. For instance, with regard to context variable 306 ("place"), context value "work" has a 1 in the second position, and context value "home" has a 1 in the first position. A variety of other encoding mechanisms are also possible. In the illustrated embodiment, such encoding helps to streamline later operations in method 200 of FIG. 2, as will described later in this application.

In step 204 of FIG. 2, multiple situation-based interest rating components are obtained. In the illustrated embodiment, these components aggregate and indicate patterns in data associations 300 of FIG. 3A. FIG. 4A helps to illustrate one simple example of this concept. FIG. 4A displays multiple situation-based interest rating components 400, which are arranged in rows. Each situation-based interest rating component, such as component 402a, associates a situation (represented by context variable 1 404 and context variable 2 406) with an interest object 408. More specifically, each situation-based interest rating component 400 is assigned to a different situation of N situations. Furthermore, each situation-based interest rating component 400 indicates an interest value 403, which indicates an intensity of an interest in interest object 408 when the corresponding situation arises.

The arrangement and configuration of the situation-based interest rating components 400 of FIG. 4A may vary, depending on the needs of a particular application. For example, each of the components 400 may contain fewer or more context variables, context values, interest objects, interest values and/or other items. Any portion of each component 400 may be encoded as binary values, a vector and/or some other format. In particular embodiments, the number of situation-based interest rating components 400 is the same as the total number of possible situations (e.g., if situations are defined by 2 context variables with X and Y numbers of possible context values respectively, then the number of situation-based interest rating components would be XY). Under particular conditions, interest values and/or context values may be missing from certain situation-based interest rating components. In some embodiments, each situation-based interest rating component is associated with only one situation and/or one interest object. Particular embodiments involve components in which the number and/or type of context variables, possible context values, interest objects and/or possible interest levels are predefined and/or limited to a discrete number. To use a simple example, the context variable "time" may be expressed using 1 of only 6 context values, indicating different periods during the day. The situation-based interest rating components can be created, processed and/or stored in various kinds of hardware, software and/or both. Some embodiments involve such components in a computer readable medium, such as a hard drive or flash memory.

FIG. 4B is a simple example that is based on the embodiment illustrated in FIG. 3B. FIG. 4B shows multiple situation-based interest rating components 410, although only 5 components are visible. Components 410 include context variable "time" 414, context variable "place" 416 and interest 418, which represents an interest in interest object "game." Context variable "time" 414 has two possible context values, "home" and "work." Context variable "place" 416 has three possible context values, "morning", "midday" and "night." Interest 418 accommodates an unlimited range of values between 0 and 4.

Each of the situation-based interest rating components 410 of FIG. 4B associates an interest value with a different situation, although this is not a requirement. Component 410a, for example, estimates an interest in a game as 2.33 (from 0 to 4) arising in a situation involving home and night. Components 410b-e correspond to different situations involving different combinations of the context values "place" and "time."

Situation-based interest rating components 410 can be determined in a wide variety of ways, depending on the needs of a particular application. In the particular embodiment illustrated in FIG. 4B, the interest values are derived from the data associations 304a-e in FIG. 3B. Situation-based interest rating component 410a of FIG. 4B will be used as an example. As noted earlier, component 410a represents the estimated interest in games (i.e., interest value=2.33) that would arise in a specific situation (i.e., the workplace at night.) To calculate component 410a, the interest values of specific data associations of FIG. 3B are averaged. In this example, this averaging calculation is applied only to those data associations that relate to the same situation as component 410a i.e., data associations 304a, 304b and 304d, which all refer to a situation involving the workplace at night. Data associations 304a, 304b and 304e have "interest in game" values of 1, 2 and 4 respectively, making their average 2.33, which is the interest value presented in FIG. 4B for component 410a. It should be appreciated that although the above example involves averaging the interest values of all data associations sharing a situation with the situation-based interest rating component in question, additional criteria may be used to include or exclude data associations from the averaging calculation. The above averaging calculation presents only one simple way of determining situation-based interest rating components. Various other techniques may also be used.

In step 206 of FIG. 2, the input situation is received. This input situation can take on various forms and be derived from a variety of sources. For example, the input situation can be represented by multiple input context values. In some embodiments, the number of possible input situations is similar to or exactly the same as the number of situation-based interest rating components and/or the number of possible situations associated with the components. The input situation, the situation-based interest rating components and/or the data associations may be limited to the same types of context variables and context values. The input situation may characterize a situation from the past, present, future and/or be selected arbitrarily. To use a simple example, the input situation in one embodiment may involve recognizing that a user is currently at "work" in the "morning."

In step 208 of FIG. 2, one of the situation-based interest rating components 410 is identified as a matching situation-based interest rating component. In particular embodiments, the matching component is the one whose situation matches partly or completely that of the input situation. To use the example presented in FIG. 4B, if the input situation is "workplace at night," then the matching situation-based interest rate component would be component 410a of FIG. 4B. This identification operation, however, need not be based solely on a situation. In particular embodiments, it is based on entirely different or additional factors, such as the interest value.

In step 210 of FIG. 2, the relevance of at least a portion of one or more other situation-based interest rating components to the matching situation-based interest rating component is determined. This relevance calculation may be performed in a variety of ways, depending on the needs of a particular application. Particular embodiments involve determining relevancies of only portions of components to portions of the matching component, such as only the situation-related portions, the interest value-related portions or both. The determining of relevancies could also involve components as a whole. Some embodiments involve calculating one or more distances between the matching situation-based interest rating component and other components. With respect to the example presented in FIG. 3B and the previous paragraph, this would mean that distances would be calculated between matching component 410a of FIG. 4B and at least one of the other components 410b-e.

The distance calculation may be performed in a variety of ways. One example is hereby presented with reference to FIG. 4B. As discussed earlier, the context values for each of the situation-based interest rating components 410 is encoded as vectors. (It should be appreciated that any portion, including the interest value portion of each component, may be encoded in vector form.) For example, situation-based interest component 410a includes context value "work," which is encoded as the vector 0 1, and the context value "night," which is encoded as vector 0 0 1. In a similar vein, the situation of component 410c is encoded as "work" (vector 0 1) and "morning" (vector 1 0 0.) One way to calculate a distance between these two vectors is combine the context value vectors for each component to form two larger vectors, and to calculate a distance between those vectors. In the illustrated example, calculating the distance between component 410a and 410c could mean calculating a distance between the vector 0 1 0 0 1 (the combined context value vectors for component 410a) and the vector 0 1 1 0 0 (the combined context value vectors for component 410c.) The inputs to the distance calculation need not be limited to situation-related vectors. They may include interest values, non-binary vectors, and/or other factors, depending on the needs of a particular application. Thus, the vectors used in a distance calculation may include values other than situation-based ones, such as interest values.

The aforementioned distance may be calculated using a variety of different formulas. For example, two possibilities include a Euclidean distance formula and a cosine distance formula. Other formulas or algorithms are also possible. The cosine distance, for example, between a vector A, defined as $[a_1\ a_2 \ldots a_n]$, and a vector B, defined as $[b_1\ b_2 \ldots b_n]$, may be calculated as follows:

$$\text{cosine}D(A, B) = \frac{a_1 b_1 + a_2 b_2 + \ldots + a_n b_n}{\left(\sqrt{a_1^2 + a_2^2 + \ldots + a_n^2}\right)\left(\sqrt{b_1^2 + b_2^2 + \ldots + b_n^2}\right)}$$

In some embodiments of the above equation, 0 values are converted into very small values. The above equation may be modified or reformulated, depending on the needs of a particular application.

The number of distance and/or relevance determinations may vary, depending on the needs of a particular application. For example, in FIG. 4B the relevance of matching component 410a to all other components (i.e. at least components 410b-e) may be determined. In alternative embodiments, this determination is not applied to components 410b and 410c, because the latter two components lack sufficient interest value data. Various factors and conditions may be involved in determining whether the relevance determination is applied to a certain situation-based interest rating component or not.

Figure 5:
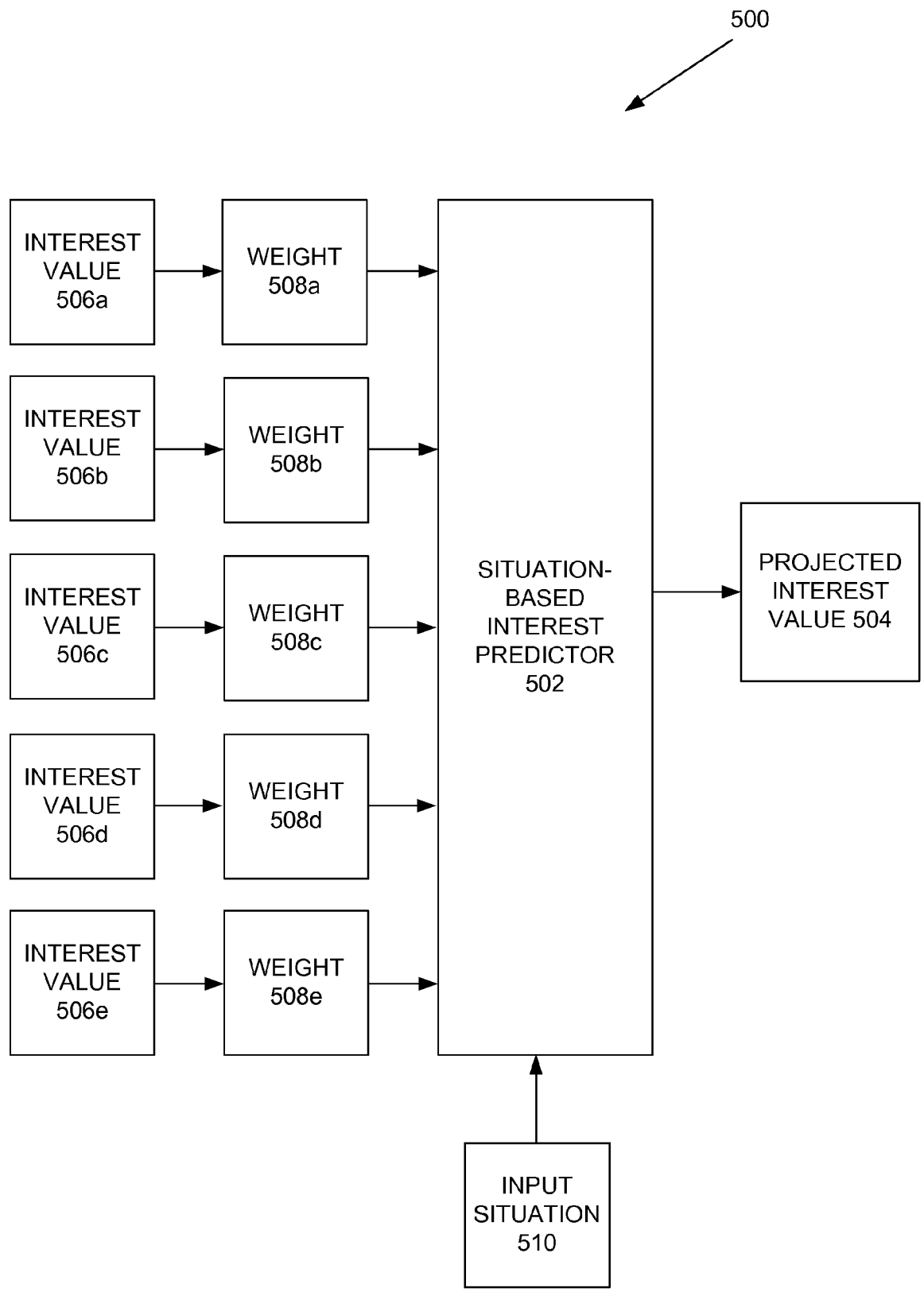
FIG. 5 depicts a block diagram of a situation-based interest predictor, interest values and their associated weights in accordance with various embodiments of the invention.

In step 212 of FIG. 2, a projected interest value in the object of interest is determined based on the relevance determinations. This step is elaborated upon in further detail in FIG. 5. FIG. 5 presents situation-based interest predictor 502, which generates projected interest value 504. As inputs, situation-based interest predictor 502 receives input situation 510, which was discussed above, and interest values 506a-e, which are weighted by weights 508a-e, respectively.

The interest values 506a-506e are derived at least partly from the interest values of specific situation-based interest rating components, such as interest values 403 of components 400 of FIG. 4A. In the illustrated embodiment, weights 508a-e influence the degree to which each associated interest value contributes to projected interest value 504. Interest values and weights may be selected and/or calculated in a variety of ways, depending on the needs of a particular application. In the illustrated embodiment of FIG. 5, the weights are determined using the distance calculations described earlier. In this simple example, the number of interest values 506a-e and weights 508a-e are also determined by the distance calculations. More specifically, the weights used in the situation-based interest predictor 502 to generate projected interest value 504 are derived from those situation-based interest rating components 400 that were closest in distance to the matching component. The number of situation-based interest rating components to be used in such a derivation may be limited to a predefined number K. Thus, in a simple example where K=5 and the matching situation-based interest rating component was component 402a of FIG. 4, interest values 506a-e of FIG. 5 match the interest values of those 5 components of components 400 that are closest to component 402a. Factors other than closeness may be used to determine the source of interest values 506a-e. K may be smaller, larger, equal to the total number of situation-based interest rating components, predetermined and/or automatically generated.

In certain embodiments, once weights 508a-508e are calculated, they can be inputted into the context-based interest level predictor 502 to generate projected interest value 504. The formulas used to predict the interest value 504 may vary greatly, depending on the needs of a particular application. One approach is to use a weighted sum. The following formula, for example, makes a prediction for an interest value based on the following weighted sum equation:

$$P = \frac{\sum_{i=1}^{K} V_i \times \text{relevance}(C_i, S)}{\sum_{i=1}^{K} \text{relevance}(C_i, S)}$$

In the above exemplary equation, P is the predicted interest value for a specific interest object. V refers to the interest value of the i-th component of K situation-based interest rating components. The function "relevance" relates to the relevance calculations described above e.g., a distance equation. S refers to the input situation. C refers to the i-th situation-based interest rating component.

Context-based interest level predictor 502 of FIG. 5 may produce one or more predictions. In particular embodiments it will predict interest levels for a wide range of interest objects (e.g., given that the user is at "home" in "midday," his interest in TV is high, his interest in sports is high, his interest in spreadsheet applications is low, etc.) Particular embodiments involve interest level predictions for hundreds or thousands of interest objects.

In some cases, it may be determined that there is insufficient data to support a prediction of an interest value related to a particular interest object. Some embodiments involve predicting an interest value using the interest values predicted for one or more other interest objects (e.g., a predicted interest in pop music may be based on a predicted interest in classical music, music applications or a combination of other interest objects.) Another possibility is to predict an interest value in an interest object based on evaluating and/or averaging the range of possible interest values for that interest object. To use a simple example, if an interest in game applications is measured on a scale of 0 to 6, a 3 may be predicted for a user, since it is the midpoint of the range. Other approaches are also possible.

The prediction equation may take a number of different forms, depending on the needs of a specific application. For example, the prediction equation may involve various kinds of context values, interest levels, interest objects, weights, situation-based interest rating components, variables and/or values. The weighted sum used above may be modified or replaced entirely with another equation. In certain embodiments, the prediction may be informed by factors other than the components, situations, values and weights referenced in a relevance determination, distance calculation and/or a weighted sum formula. One embodiment may involve using predictions of various interest levels to return better search results to a user accessing a search engine. The predictions may be based not only on the context values characterizing the situation of the user (e.g., the time of day, the user's location and activity logs, etc.), but also on the keywords the user is typing in as well as other types of data. In one example, the prediction could be improved by reviewing a history of the user's past searches and/or page views and determining from them additional keywords and/or data that may help improve the accuracy of the search. In this example, such keywords and data may influence the predictions, but may not be used in a weighted sum formula and/or included in a set of probability values as described earlier.

Figure 6A:
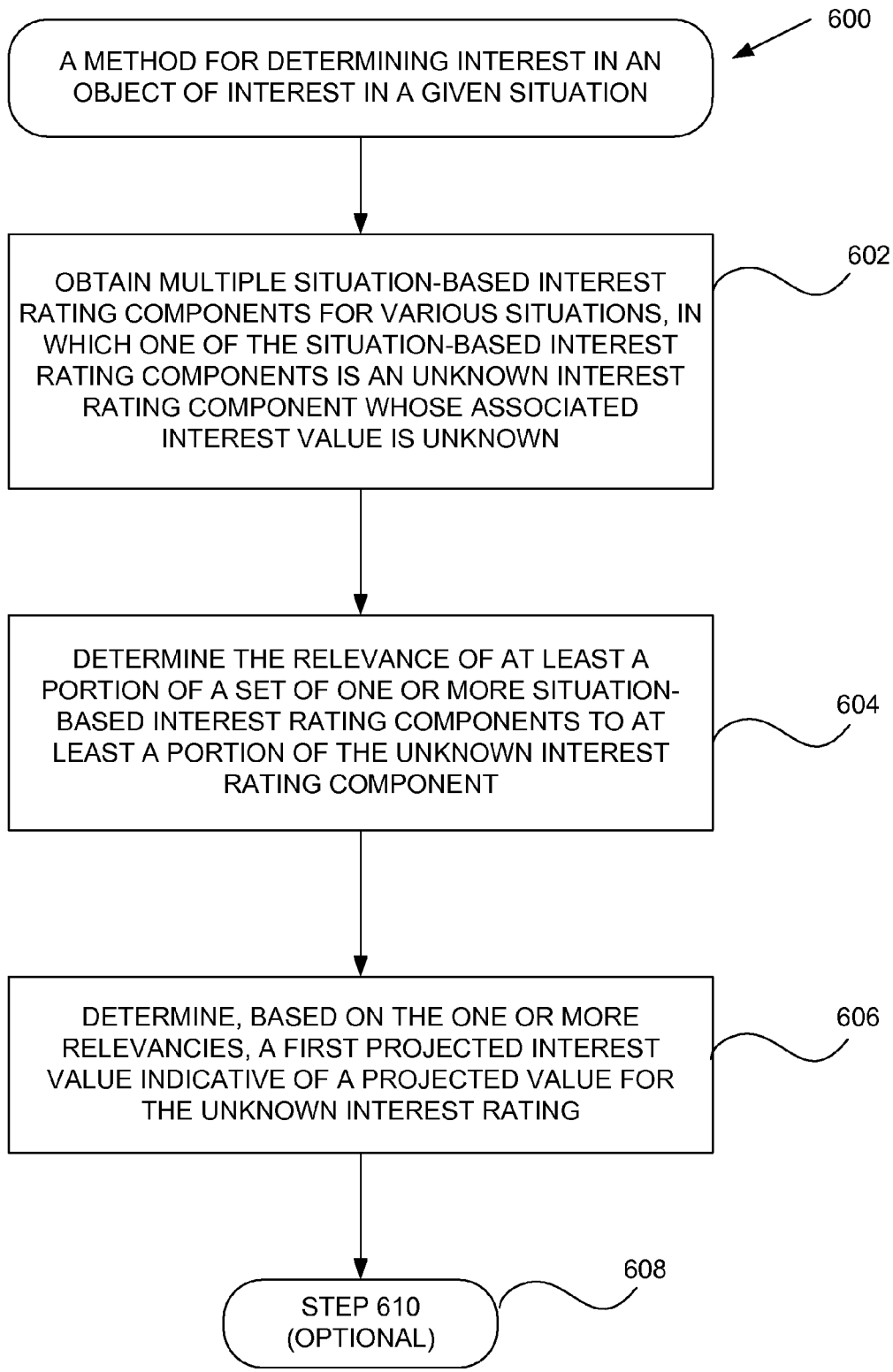
FIGS. 6A and 6B depicts an alternative method for determining interest in an object of interest in a given situation in accordance with various embodiments of the invention.
Figure 6B:
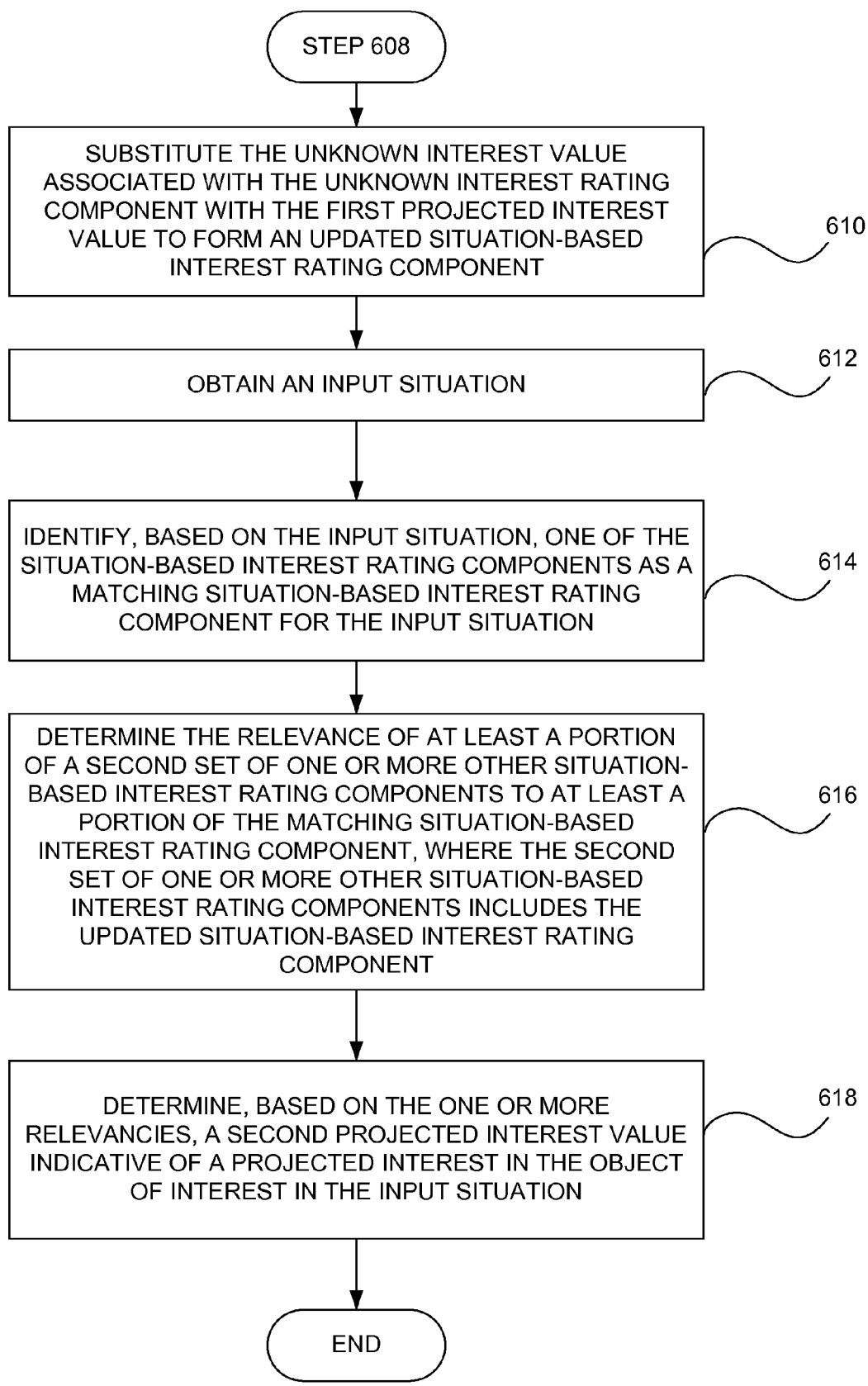

Another embodiment of the invention is presented in FIGS. 6A and 6B. FIGS. 6A and 6B describe an exemplary method 600 that addresses circumstances in which the intensity of a user's interest in an object of interest is unknown or unclear in one or more situations. Method 600 may be used to predict an interest value for one such situation, which in turn may be used to predict interest values for other situations.

Initially, in step 602 of method 600 multiple situation-based interest rating components are obtained. One or more of these components is an unknown interest rating component with an unknown interest value. In other words, the interest value of this component is inadequately supported, unclear and/or non-existent. To use a simple example, it may represent a circumstance in which it would be desirable to know the intensity of user A's interests in, say, game applications when user A is at home in the evening, but the intensity of that interest is not known with a sufficient level of certainty.

In step 604, the relevance of one or more situation-based interest rating components to the unknown interest rating component is determined. In some embodiments, this determination is based only on portions of each such component. In certain other embodiments, the determination is based on each of these components as a whole. This operation may take place in a manner similar to aspects of step 208 of FIG. 2. As noted above, the determination of such relevancies may involve the encoding of situations, interest values and/or entire situation-based interest rating components as vectors, and the finding of distances between such vectors.

In step 606, a first projected interest value for the unknown interest rating is determined. This step may take place in a manner similar to step 212 of FIG. 2.

Particular embodiments involve the addition of steps to method 600 of FIG. 6A. One such embodiment is presented in FIG. 6B. In step 610, the unknown interest value for the unknown interest rating component is substituted with the first projected interest value described in step 608 of FIG. 6A. The unknown interest rating component, which previously had an unclear or unsupported interest value associated with it, now has been updated with a new interest value. This updated interest rating component can be used to make further predictions, as outlined in steps 612, 616 and 618.

In step 612, an input situation is obtained. In step 614, one of the situation-based interest rating components is identified as matching the input situation. These steps may be similar to steps 206 and 208 of FIG. 2. In particular embodiments, these steps may identify another situation-based interest rating component that lacks a clear and/or well-supported interest value.

In step 616, the relevance of at least a portion of one or more situation-based interest rating components to at least a portion of the matching situation-based interest component is determined. The group of situation-based interest components that are involved in this determination may or may not be different from the ones referred to in step 604. In many aspects, this step may be performed in a manner similar to step 210 of FIG. 2 and step 604 of FIG. 6A. In step 616, however, the group of components involved in this relevance determination includes the updated interest rating component (formerly, the unknown interest rating component) described in steps 602 and 610 of FIGS. 6A and 6B respectively. Thus, the results of the first prediction, which was determined in step 606 of FIG. 6A, are being used to augment a second prediction, which is described in step 618 of FIG. 6B.

In step 618, a second projected interest value is predicted. This step may be performed in a manner similar to steps 212 and 606 of FIG. 2 and FIGS. 6A respectively.

It should be appreciated that steps 602, 604, 606, 610, 612, 614, 616 and 618, in part or in whole, may be repeated numerous times. Particular embodiments involve multiple situation-based interest rating components, in which the components fall into two groups. Some of these components are well-supported and have associated interest values that are believed to be reasonably accurate. Other components in the same group, however, may have defective interest values i.e. interest values that are unclear, non-existent and/or possibly inaccurate. These components raise a concern that, for instance, the preferences or interests of one or more users are unknown in certain types of situations. The steps mentioned above can be used to substitute a defective interest value of a component with an estimated one, which, in a manner of speaking, "repairs" the component. By iterating this process, previously "repaired" components can potentially be used to make predictions for and "repair" other components.

Particular embodiments of the invention offer several advantages. For example, in making predictions, the invention allows for the weighing of numerous different context variables and context values, so that more accurate predictions of an entity's interests can be made. The context variables and values tracked and/or processed by embodiments of the invention can vary greatly, depending on the needs of a particular application. For example, the context variables and values may pertain to geographical factors, physical/biological factors, environmental variables (e.g., location, temperature, presence of nearby devices, GPS signals, components, proximity of human beings, buildings and/or signals, motion, acceleration, velocity etc.) and/or internal variables (e.g., time, open and/or active applications, mode of operation, condition, event, power, force, Internet browsing behavior, pattern of selected ads, direct or indirect feedback from the person etc.).

Another advantage of some embodiments of the invention is their ability to flexibly respond to changing environments and circumstances. For example, in particular embodiments new context values and variables can be easily integrated into the making of future predictions. Some embodiments do not require training or direct feedback from a user about the user's interests, because situation-based interest rating components and predictions can be generated dynamically and/or invisibly from various sources of data, such as observed user behavior. Additionally, certain embodiments need not rely on predetermined rules that prioritize some context variables, context interest, interest objects and/or interest rules over others (e.g., a rule prioritizing a "place" context variable over a "time" variable, etc.). Particular embodiments involve a weighing or prioritization process that is derived entirely from a comparison or distance calculation involving the matching situation-based interest rating component and one or more other situation-based interest rating components (e.g., as described in step 210 of FIG. 2). Certain embodiments do not have or require a rule that predetermines a greater weight for one situation-based interest rating component, context variable, interest object and/or interest value over others prior to the collection of user data, the obtaining of situation-based interest rating components and/or relevance determinations involving one or more of the same.

Another advantage of particular embodiments is that there is no need to cluster data. Particular embodiments of the invention do not involve defining a number of clusters, clustering two or more data points, finding the centers of clusters and/or calculating a distance between a data point and a center of one of the clusters.

An additional advantage is that particular embodiments of the invention can be used to predict the interests of a user without accessing the behavior of other users. That is, in certain embodiments of the invention situation-based interest rating components and predictions may be derived from data collection systems that are limited only to the contexts, behavior and/or characteristics of a single person or a selected group of people. This approach helps to improve privacy.

A number of applications may be envisioned for particular embodiments of the invention. For example, one embodiment involves a client mobile device, such as a cell phone, PDA, health monitor or portable laptop computer, and a server. The client mobile device has a communication link with the server so that data can be exchanged between them. The client mobile device may store a log of the person's behavior and possibly transmit it to the server for long-term storage and processing. Such log data could be transformed into data associations or some other format and stored in a computer readable medium. Portions or all of the log data could be processed by the server to obtain situation-based interest rating components. For example, data parsing could unveil that the person typically has a high level of interest in spreadsheet applications at work in the morning and has on average a low level of interest in spreadsheet applications at home in the evening. The client mobile device may also be used to obtain the input situation (e.g., as described in step 206 of FIG. 2) and transmit it the server. The client mobile device, for example, may inform the server that the person is currently near a specific retail outlet, in motion and in downtown New York. The server could use various situation-based interest rating components and the input situation to make a prediction of the person's interest in an object of interest in accordance with steps 208, 210 and 212 of FIG. 2. For example, the server could predict that the person would have a high degree of interest in consumer electronics and retail advertisements, in part because the person is out shopping and has shown such a pattern of interest under similar circumstances in the past.

In some embodiments, an action may be taken based on a prediction once it is determined that the predicted interest level has reached a certain threshold. Particular embodiments of the invention involve identifying situations, as characterized by specific combinations of context values, that prompt the running of an application, because of an earlier prediction that the interest levels for one or more interest objects is particularly high when that particular combination of context values arises. In the above example, a server may calculate that a user's interest level in retail advertisements and electronics is high when the device (and therefore the person) is in motion and near specific retail outlets. The mobile device may transmit an alert to the server when the mobile device detects that such conditions have arisen. In response, the server may direct the mobile device to transmit ads or suggestions to the person relating directly or indirectly to shopping and consumer electronics. Many variations on the above example are possible.

It should be noted that the techniques of the invention can be combined with other techniques. For example, the techniques of the invention can be used in combination with the techniques for predicting interest described in U.S. Patent Application Ser. No. (12/343,393), entitled: "SEMANTICS-BASED INTERESTS IN COMPUTING ENVIRONMENTS AND SYSTEMS," which is hereby incorporated by references herein for all purposes.

It should also be noted that techniques for predicting interest are described in U.S. Patent Application Ser. No. (12/343, 392), entitled: "RATING-BASED INTERESTS IN COMPUTING ENVIRONMENTS AND SYSTEMS," which is hereby incorporated by references herein for all purposes.

The various aspects, features, embodiments or implementations of the invention described above can be used alone or in various combinations. The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A computer-implemented method of determining a degree of interest that a user has in a first activity when the user is using a mobile device in a particular context, wherein said method comprises:
    obtaining information indicating changes in a context of the user and the device, the information indicating that the user and the device are in a first plurality of different contexts that are selected from the group consisting of 1) a plurality of different locations that the device and the user are in; 2) a plurality of different times when the user uses the device; 3) a plurality of different environments that are sensed by the device; 4) a plurality of different temperatures that are sensed by the device; 5) a plurality of different electrical components that are detected by the device; 6) a plurality of different types of motion that the device senses; 7) a plurality of different distances between the device and an external object; and 8) a plurality of different biological conditions of the user that are sensed by the device;
    obtaining user data that indicates multiple usages of a device by a user over time, the user data further indicating that each usage of the device involves a particular degree of involvement by the user in the first activity, which further indicates that the user has one of a first plurality of different interest levels in the first activity, the user data further indicating that the user and the device, at the time of each usage, are in one of the first plurality of different contexts;
    based on the user data, determining a plurality of context-based interest rating components, each interest rating component associated with a particular context of the first plurality of contexts and including an interest value that estimates a degree of interest of the user in the first activity when the user is in said associated context, each interest rating component being calculated based on the usages of the device that took place in said associated context;
    obtaining an input context that indicates that the user and the device are in one of the first plurality of contexts;
    identifying, based on said input context, one of said interest rating components as a matching interest rating component for said input context;
    determining the relevance of at least a portion of one or more other interest rating components to said matching interest rating component; and
    determining, based on said one or more relevancies, a projected interest value indicative of a projected interest of the user in said first activity when the user is in said input context.

2. The method of claim 1 wherein the first plurality of different contexts are the plurality of different locations that the device and user are in.

3. The method of claim 2 wherein:
    the user data is organized into a plurality of data associations, each data association providing information about a particular usage of the device by the user, each data association including an associated one of the first plurality of interest levels and an associated one of the plurality of locations, each data association thereby indicating that the user, when using the device at a particular time in the associated one of the plurality of locations, had a degree of interest in the first activity that is represented by the associated one of the interest levels;
    each interest rating component is associated with a particular location of the plurality of locations, the interest level of the interesting rating being based on at least some of the data associations of the user data that involve the same location as the particular location associated with the interesting rating component; and
    the interest levels of the interest rating components are based on different subsets of the data associations of the user data.

4. The method of claim 3, wherein a first one of the contexts associated with the interest rating components is encoded using 1-in-N encoding, N being an integer equal to the number of possible contexts in the first plurality of contexts, such that the first one of the contexts is encoded as a vector with at least N values.

5. The method of claim 1, wherein said determining of relevance comprises one or more of the following:
    determining the relevance of contexts associated with said one or more other interest rating components to the context associated with said matching interest rating component;
    determining the relevance of the interest values of said one or more other interest rating components to the interest value of said matching interest rating component; and
    determining the relevance of said one or more other interest rating components as a whole to said matching interest rating component considered as a whole.

6. The method of claim 5, wherein each of said interest rating components is represented in a vector form.

7. The method of claim 6, wherein determining the relevance of said one or more other interest rating components as a whole comprises considering entire said vector forms.

8. The method of claim 5, wherein:
at least one of said interest rating components is an unknown interest rating component that includes an unknown interest value; and
said determining of the relevance of interest values of said one or more other interest rating components comprises: not considering said unknown interest value.

9. The method of claim 1, wherein at least one of said interest rating components is an average-based interest rating component that includes an average interest value.

10. The method of claim 9, wherein said method further comprises:
determining said average interest value at least by averaging a plurality of known interest levels associated with a repeated occurrence of the context associated with said average-based interest rating component in the user data.

11. The method of claim 1, wherein said method further comprises:
assigning an initial value to an unknown interest value, the unknown interest value having a range of possible interest values; and
updating said initial value based on one or more of the following: a) the projected interest value; and b) an approximate midpoint of the range of possible interest values.

12. The method of claim 1, wherein:
the user data includes a set of data associations, each data association storing data on each usage of the device by the user, the user data thereby including a plurality of data associations, each data association associated with a particular context of the first plurality of contexts and a particular interest level of the plurality of interest levels, said associated context and said associated interest level indicating that the user was in the associated context when the user had the associated interest level in the first activity, the associated context being represented by at least one data association context variable, each data association context variable having a plurality of possible data association context values.

13. The method of claim 12, wherein said obtaining of said plurality of interest rating components includes averaging the data association interest levels associated with a subset of the set of data associations, the subset including two or more data associations that have the same associated context.

14. The method of claim 1, wherein:
the context associated with a first one of the plurality of interest rating components is encoded as at least a portion of a first multi-dimensional vector;
the input context is encoded as at least a portion of a second multi-dimensional vector;
the determining of the projected interest level uses a weighted sum, the weighted sum being based at least partly on the calculating of a distance between the first multi-dimensional vector and the second multi-dimensional vector.

15. The method of claim 14, wherein the calculating of the distance includes at least one of a group consisting of: a) calculating a cosine distance; and b) calculating a Euclidean distance.

16. The method of claim 1, wherein:
each interest rating component is associated with a situation, the interest rating component indicating how much interest the user has in the first activity when the user is in the associated situation; and
the situation associated with each interest rating component is different from the situations associated with any of the others of the plurality of interest rating components, each situation involving at least one of the first plurality of different contexts and one of a second plurality of different contexts.

17. The method of claim 16, wherein the first plurality of different contexts is the plurality of different locations that the device and the user are in and the second plurality of different contexts are a plurality of different times that the user uses the device and wherein the situation of each interest rating component indicates a combination of a particular time and a particular location at which the user uses the device, the combination of said time and said location being unique relative to the combinations associated with the other components in the plurality of interest rating components.

18. The method of claim 1, wherein each one of the plurality of interest rating components includes the interest value that estimates a degree of interest of the user in the first activity and another interest value that estimates a degree of interest of the user in a second, different activity.

19. The method of claim 1 wherein:
a first one of the plurality of situation-based interest rating components is a first unknown interest rating component whose said associated interest value is unknown;
the method further comprises determining a closeness of a match between at least a portion of a first set of one or more of the other interest rating components to at least a portion of said first unknown interest rating component; and
determining, based on the determining of the closeness of the match, a second projected interest value indicative of a projected value for said unknown interest rating.

20. The method of claim 19, further comprising:
substituting said unknown interest value associated with the first unknown interest rating component with the second projected interest value to form an updated interest rating component wherein the one or more other interest rating components used in the determining of the relevance includes the updated interest rating component.

21. A computing system comprising:
at least one processor;
a memory including computer readable instructions that, when executed by the at least one processor, cause the computing system to:
obtain information indicating changes in a context of the user and the device, the information indicating that the user and the device are in a first plurality of different contexts that are selected from the group consisting of 1) a plurality of different locations that the device and the user are in; 2) a plurality of different times when the user uses the device; 3) a plurality of different environments that are sensed by the device; 4) a plurality of different temperatures that are sensed by the device; 5) a plurality of different electrical components that are detected by the device; 6) a plurality of different types of motion that the device senses; 7) a plurality of different distances between the device and an external object; and 8) a plurality of different biological conditions of the user that are sensed by the device;
obtain user data that indicates multiple usages of a device by a user over time, the user data further indicating that each usage of the device involves a particular degree of involvement by the user in the first activity, which further indicates that the user has one of a first plurality of different interest levels in the first activity, the user data further indicating that the user and the device, at the time of each usage, are in one of the first plurality of different contexts;

based on the user data, determine a plurality of context-based interest rating components, each interest rating component associated with a particular context of the first plurality of contexts and including an interest value that estimates a degree of interest of the user in the first activity when the user is in said associated context, each interest rating component being calculated based on the usages of the device that took place in said associated context;

obtain an input context that indicates that the user and the device are in one of the first plurality of contexts;

identify based on said input context, one of said interest rating components as a matching interest rating component for said input context;

determine the relevance of at least a portion of one or more other interest rating components to said matching interest rating component; and determine, based on said one or more relevancies, a projected interest value indicative of a projected interest of the user in said first activity when the user is in said input context.

22. The computing system of claim 21, wherein said computing system includes one or more of the following:
   a server configured to perform the determining of the plurality of interest rating components, the identifying of one of said interest rating components, the determining of the relevance, and the determining of the projected interest value; and
   a client coupled with the server, the client configured to perform the obtaining of the input context and further configured to transmit the input context to the server.

23. A computer readable medium embodied in a tangible form including executable computer program code operable to predict an interest in an object of interest in a situation, wherein the computer readable medium includes:
   executable computer code operable to obtain information indicating changes in a context of the user and the device, the information indicating that the user and the device are in a first plurality of different contexts that are selected from the group consisting of 1) a plurality of different locations that the device and the user are in; 2) a plurality of different times when the user uses the device; 3) a plurality of different environments that are sensed by the device; 4) a plurality of different temperatures that are sensed by the device; 5) a plurality of different electrical components that are detected by the device; 6) a plurality of different types of motion that the device senses; 7) a plurality of different distances between the device and an external object; and 8) a plurality of different biological conditions of the user that are sensed by the device;
   executable computer code operable to obtain user data that indicates multiple usages of a device by a user over time, the user data further indicating that each usage of the device involves a particular degree of involvement by the user in the first activity, which further indicates that the user has one of a first plurality of different interest levels in the first activity, the user data further indicating that the user and the device, at the time of each usage, are in one of the first plurality of different contexts;
   executable computer code operable to determine, based on the user data, a plurality of context-based interest rating components, each interest rating component associated with a particular context of the first plurality of contexts and including an interest value that estimates a degree of interest of the user in the first activity when the user is in said associated context, each interest rating component being calculated based on the usages of the device that took place in said associated context;
   executable computer code operable to obtain an input context that indicates that the user and the device are in one of the first plurality of contexts;
   executable computer code operable to identify based on said input context, one of said interest rating components as a matching interest rating component for said input context;
   executable computer code operable to determine the relevance of at least a portion of one or more other interest rating components to said matching interest rating component; and
   executable computer code operable to determine, based on said one or more relevancies, a projected interest value indicative of a projected interest of the user in said first activity when the user is in said input context.

24. A computer-implemented method of determining a degree of interest that a user has in an activity when the user is using mobile device in a particular context wherein said method comprises:
   identifying a plurality of different possible contexts in which the user could use the device, wherein the number of possible contexts is predetermined;
   identifying a plurality of different possible levels of interest that the user could have in a particular activity, wherein the number of possible interest levels is predetermined;
   tracking multiple usages of the mobile device by a user;
   during the tracking, for each usage, forming a corresponding usage record;
   during the tracking, for each usage, storing information in the corresponding usage record that indicates which context the usage took place in;
   during the tracking, for each usage, storing information in the corresponding usage record that relates to how the user interacted with the device;
   for each usage, determining that said interaction indicates one of said possible interest levels in said activity, thereby linking each usage of the device and each corresponding usage record with one of the predetermined interest levels and one of the predetermined contexts;
   determining a plurality of vectors wherein:
      each vector is associated with a different one of the predetermined contexts;
      each vector represents an average interest level of the user when the user is in the context associated with the vector;
      the average interest level for each vector is an interest level that is calculated based on the interest levels of the relevant usage records in the user data, the relevant usage records for each vector being those usage records that are linked to the context associated with the vector;
   obtaining an input context that indicates that the user and the device are in one of the plurality of contexts;
   determining a distance between the input context and each of the plurality of vectors that includes a first and second vector wherein the first and second vectors are associated with first and second different contexts and first and second average interest levels, respectively; and calculating a projected interest level of the user in said activity based on the distance determination wherein if the distance between the first vector and the input context is smaller than the distance between the second vector and the input context, then the first average interest level will be weighed more heavily in the calculation of the projected interest level than the second average interest level, wherein the plurality of predetermined contexts are selected from the group consisting of: 1) a plurality of different locations that the device and the user are in; 2) a plurality of different times when the user uses the device; 3) a plurality of different environments that are sensed by the device; 4) a plurality of different temperatures that are sensed by the device; 5) a plurality of different electrical components that are detected by the device; 6) a plurality of different types of motion that the device senses; 7) a plurality of different distances between the device and an external object; and 8) a plurality of different biological conditions of the user that are sensed by the device.

* * * * *